(12) United States Patent
Noda et al.

(10) Patent No.: US 7,823,383 B2
(45) Date of Patent: Nov. 2, 2010

(54) ACTUATOR DRIVING DEVICE

(75) Inventors: Atsuhiro Noda, Ashiya (JP); Shigeru Wada, Kishiwada (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 617 days.

(21) Appl. No.: 11/724,348

(22) Filed: Mar. 15, 2007

(65) Prior Publication Data

US 2007/0247101 A1  Oct. 25, 2007

(30) Foreign Application Priority Data

Mar. 17, 2006  (JP) ............................. 2006-074371

(51) Int. Cl.
*F01B 29/10* (2006.01)
*F02G 1/04* (2006.01)
*H03K 3/017* (2006.01)
*H03K 5/04* (2006.01)
*H03K 7/08* (2006.01)
*H03K 5/02* (2006.01)
*H03K 7/02* (2006.01)
*G03B 17/00* (2006.01)

(52) U.S. Cl. .............................. 60/528; 60/527; 60/529; 327/172; 327/175; 327/178; 396/52

(58) Field of Classification Search ................. 310/307; 318/116, 117; 327/35, 36, 172–178; 219/482–494
See application file for complete search history.

(56) References Cited

U.S. PATENT DOCUMENTS

| | | | | | |
|---|---|---|---|---|---|
| 3,078,944 | A | * | 2/1963 | Gray | ............................ 180/167 |
| 3,705,314 | A | * | 12/1972 | Haurykiewicz | .............. 327/172 |
| 4,293,817 | A | * | 10/1981 | DeMichele | .................. 327/172 |
| 5,459,544 | A | * | 10/1995 | Emura | .......................... 396/257 |
| 6,157,779 | A | * | 12/2000 | Kosaka et al. | .................. 396/55 |
| 6,434,932 | B2 | * | 8/2002 | Hara et al. | ...................... 60/527 |
| 6,464,200 | B1 | * | 10/2002 | Hines et al. | .................... 251/11 |
| 6,516,146 | B1 | * | 2/2003 | Kosaka | ......................... 396/55 |
| 6,554,501 | B2 | * | 4/2003 | Kosaka et al. | ............... 396/452 |
| 7,295,770 | B2 | * | 11/2007 | Uenaka et al. | ................. 396/55 |

FOREIGN PATENT DOCUMENTS

JP    2000-112526 A    4/2000

* cited by examiner

*Primary Examiner*—Thomas E Denion
*Assistant Examiner*—Christopher Jetton
(74) *Attorney, Agent, or Firm*—Sidley Austin LLP

(57) ABSTRACT

An actuator driving device includes: an actuator made of a shape metal alloy having a property that a predetermined shape is memorized in advance, and that the predetermined memorized shape is recovered when the actuator is heated to a predetermined temperature; an applier for applying, to the actuator, a pulse current or a pulse voltage at least having a predetermined current value or a predetermined voltage, and a predetermined duty ratio to heat the actuator; and a determiner for determining the current value or the voltage value, and the duty ratio of the pulse current or the pulse voltage to be applied to the actuator by the applier, wherein the determiner is operative to determine the pulse current or the pulse voltage having: the current value larger than a current value of a constant current required for displacing the actuator by a predetermined targeted displacement amount, or the voltage value corresponding thereto; and the duty ratio of making an applied current amount smaller than an applied current amount corresponding to an integrated value of the constant current in applying the constant current to the actuator.

21 Claims, 10 Drawing Sheets

ACTUATOR DRIVING DEVICE

This application is based on Japanese Patent Application No. 2006-074371 filed on Mar. 17, 2006, the contents of which are hereby incorporated by reference.

BACKGROUND OF THE INVENTION

1. Field of the Invention

The present invention relates to an actuator driving device for driving an actuator using a shape memory alloy.

2. Description of the Background Art

A shape memory alloy (SMA) has a property that it recovers its shape when heated to a temperature equal to or higher than a reverse transformation completion temperature, even if it is plastically deformed when being subjected to an external force at a temperature equal to or lower than a martensite transformation completion temperature. For instance, when the SMA is energized, it generates an exothermic heat by its Joule heat, and when the temperature of the SMA reaches the reverse transformation completion temperature or exceeds the reverse transformation completion temperature, it recovers its shape. The SMA is usable as a material for an actuator, by utilizing the aforementioned property. Concerning the SMA actuator, Japanese Unexamined Patent Publication No. 2000-112526 discloses a driving circuit for driving a movable member which is horizontally movable in a uniaxial direction by an SMA actuator. In using the driving circuit of the SMA actuator, a current to be applied to the SMA actuator is analogly or digitally controlled so as to displace the SMA actuator by an intended amount, whereby the movable object is moved to an intended position in accordance with the applied current.

The conventional art, however, does not disclose an arrangement of reducing the amount of current to be applied to the SMA actuator i.e. an electric power, as compared with an electric power required in a case that the SMA actuator is in a constant driving condition i.e. a temperature or heat equilibrium condition, in other words, an arrangement of suppressing an electric power consumption concerning the SMA actuator. In particular, waste of electric power consumption involves a serious issue in the case where a usable electric power is limited as in the field of a compact portable electric device using a battery or a like device.

SUMMARY OF THE INVENTION

In view of the above problems residing in the conventional examples, it is an object of the present invention to provide an actuator driving device that enables to suppress an electric power consumption rate, while securing an intended displacement by an SMA actuator in driving the SMA actuator.

According to an aspect of the invention, an actuator driving device includes: an actuator made of a shape metal alloy having a property that a predetermined shape is memorized in advance, and that the predetermined memorized shape is recovered when the actuator is heated to a predetermined temperature; an applier for applying, to the actuator, a pulse current or a pulse voltage at least having a predetermined current value or a predetermined voltage, and a predetermined duty ratio to heat the actuator; and a determiner for determining the current value or the voltage value, and the duty ratio of the pulse current or the pulse voltage to be applied to the actuator by the applier, wherein the determiner is operative to determine the pulse current or the pulse voltage having: the current value larger than a current value of a constant current required for displacing the actuator by a predetermined targeted displacement amount, or the voltage value corresponding thereto; and the duty ratio of making an applied current amount smaller than an applied current amount corresponding to an integrated value of the constant current in applying the constant current to the actuator.

These and other objects, features and advantages of the present invention will become more apparent upon reading the following detailed description along with the accompanying drawing.

BRIEF DESCRIPTION OF THE DRAWINGS

FIGS. 10A and 10B are graphs showing a relation between a constant current to be applied to an SMA actuator, and a displacement of the SMA actuator, as implemented in a general art, wherein FIG. 10A shows that a current I1 is necessary to obtain a displacement amount P1, and FIG. 10B shows that the current I1 is a constant current.

DETAILED DESCRIPTION OF THE PREFERRED EMBODIMENTS

Figure 1:
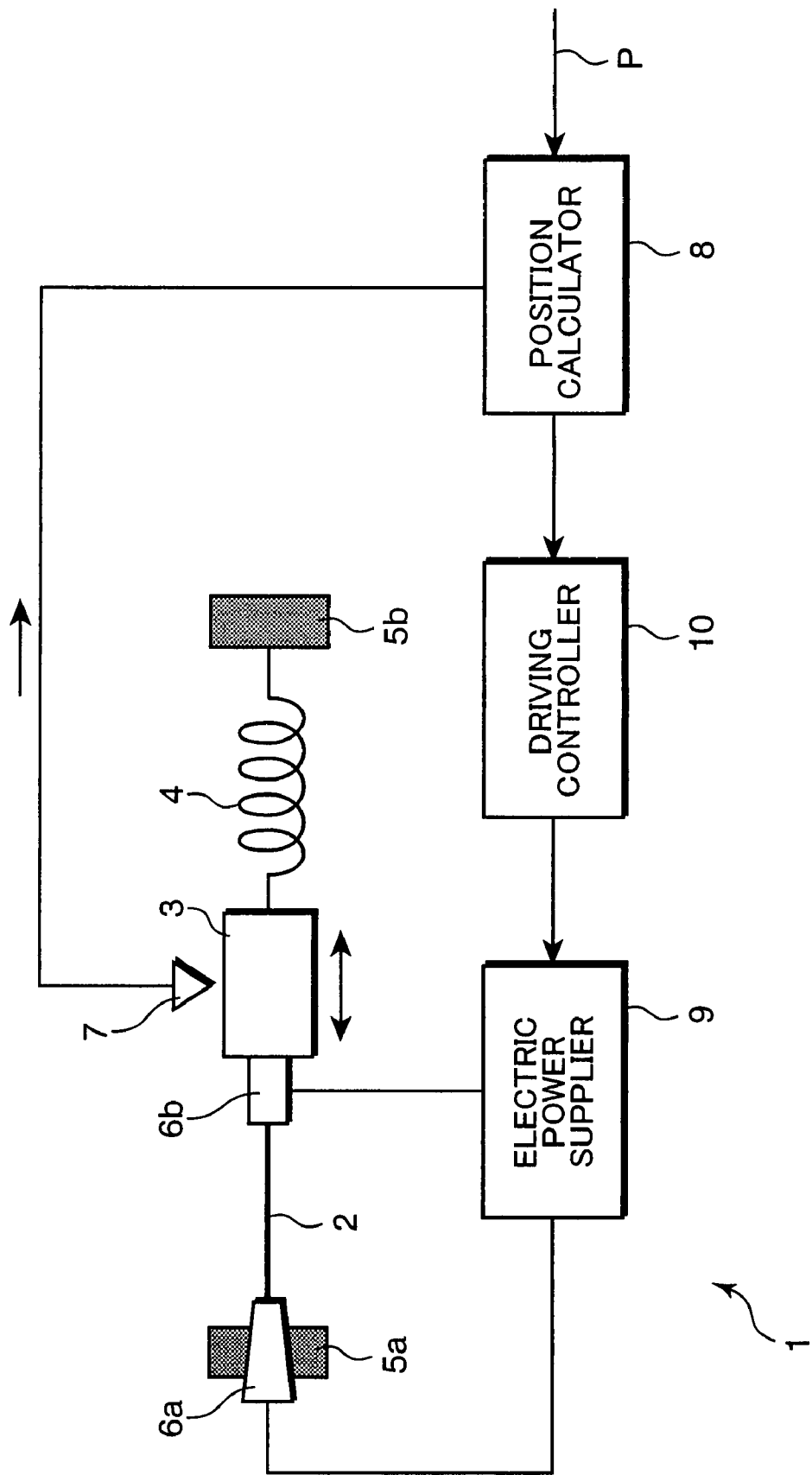
FIG. 1 is a schematic diagram showing an actuator driving device embodying the invention.

FIG. 1 is a schematic diagram showing an actuator driving device embodying the invention. As shown in FIG. 1, the actuator driving device 1 includes an expandable/contractible actuator 2, a movable member 3, a biasing member 4, fixing members 5a, 5b, support members 6a, 6b, a position sensor 7, a position calculator 8, an electric power supplier 9, and a driving controller 10. The expandable/contractible actuator 2 is made of a shape metal alloy (SMA) e.g. Ni—Ti—Cu alloy, and is a actuator for moving i.e. displacing the movable member 3 by its expansion or contraction in accordance with energization and de-energization. The actuator 2 is a wire member, with a substantially circular shape in cross section. In the specification, the circular shape means a perfect circle in order to discriminate the perfect circular shape from an elliptical shape and a circular shape other than the perfect circular shape, which will be described later. The circular cross section of the actuator 2 has a diameter from e.g. about 30 μm to 200 μm. The expandable/contractible actuator 2 has a property that a predetermined shape is memorized in advance, and that the memorized shape is recovered when an exothermic heat is generated by energization, and the temperature of the actuator 2 reaches a predetermined temperature. In the embodiment, the expandable/contractible actuator 2 memorizes a shape, namely, a contractible amount by which the length of the actuator 2 is shortened when the actuator 2 is energized. Hereinafter, the expandable/contractible actuator 2 is called as "SMA actuator 2".

The movable member 3 is fixed to one end of the SMA actuator 2 by way of the support member 6b, and is moved in accordance with expansion/contraction of the SMA actuator 2. The movable member 3 is an object to be controlled by the SMA actuator 2. The biasing member 4 includes e.g. a coil spring, and is adapted to apply a biasing force to the movable member 3. An end of the biasing member 4 is connected i.e. linked to the movable member 3. The biasing member 4 has a biasing force acting in such a direction as to contract the biasing member 4. As shown in FIG. 1, the movable member 3 is held in a state that it is urged toward the fixing member 5b in a normal temperature condition. In the embodiment, the actuator driving device 1 is so constructed that the movable member 3 causes a linear displacement. Alternatively, the actuator driving device 1 may be so constructed that the movable member 3 causes a rotational displacement.

The fixing members 5a and 5b are members e.g. frames for fixing the SMA actuator 2, the movable member 3, and the biasing member 4. The fixing member 5a fixes one end of the SMA actuator 2 via the support member 6a, and the fixing member 5b fixes the other end of the biasing member 4. The support members 6a and 6b are adapted to support the SMA actuator 2 and the movable member 3, and are energizable i.e. functioned as support members and energizing members. The support members 6a and 6b each includes e.g. a metallic terminal having conductivity so that a current i.e. a voltage is applied to the SMA actuator 2 by way of the support members 6a and 6b. The support members 6a and 6b are fixed to the fixing member 5a and the movable member 3, respectively.

The position sensor 7 is a sensor for detecting position information relating to the position of the movable member 3. The position calculator 8 executes a computation concerning a moved position of the movable member 3, based on the position information detected by the position sensor 7, and calculates a displacement amount necessary for moving the movable member 3 to a predetermined targeted position. Specifically, the position calculator 8 calculates a displacement amount of the movable member 3 with respect to a time when the movable member 3 is started to move, based on the position information outputted from the position sensor 7 by feed-back control, and calculates a difference (hereinafter, called as "displacement amount difference") between the calculated displacement amount, and a targeted displacement amount required for moving the movable member 3 to a targeted position determined at the movement start time. Information relating to the displacement amount difference is inputted to the driving controller 10. The information relating to the targeted position is outputted to the position calculator 8, as a targeted position designation signal P by way of e.g. an unillustrated operation section or the like. The position calculator 8 may constitute a servo control functioning part for executing servo control for the actuator driving device 1.

The electric power supplier 9 includes an electric power supply circuit, and is adapted to supply an electric power i.e. a current or a voltage to the SMA actuator 2 via the support members 6a and 6b. Specifically, the electric power supplier 9 applies, to the SMA actuator 2, a pulse current having a predetermined current value, a predetermined duty ratio, and a predetermined cycle in accordance with a command signal from the driving controller 10. Alternatively, a voltage corresponding to the predetermined current may be applied. In the latter case, the electric power supplier 9 may apply a pulse voltage having a predetermined voltage value to the SMA actuator 2. In this embodiment, description is made based on a premise that a current i.e. a current value or a pulse current is applied.

The driving controller 10 includes a drive controlling circuit, and is adapted to control driving i.e. expansion/contraction of the SMA actuator 2 by controlling the current to be outputted from the electric power supplier 9, based on the information relating to the displacement amount difference, which is outputted from the position calculator 8. In the control of the SMA actuator 2, the driving controller 10 calculates a current value and a duty ratio (and a cycle) of the pulse current to be applied to the SMA actuator 2 by the electric power supplier 9 for determining the current value and the duty ratio (and the cycle) of the pulse current, and controls the output of the pulse current from the electric power supplier 9 in accordance with the determined information. In the servo control, the driving controller 10 is operative to change at least one of the current value and the duty ratio (and the cycle) in determining the current value and the duty ratio, and to vary a degree of change concerning the current value and the duty ratio (and the cycle) in accordance with the displacement difference amount outputted from the position calculator 8. Alternatively, table information, in which displacement difference amounts and degrees of change are correlated to each other, may be stored in e.g. the driving controller 10, and the degree of change concerning the current value and the duty ratio may be varied in accordance with the displacement difference amount, based on the table information.

Figure 10A:
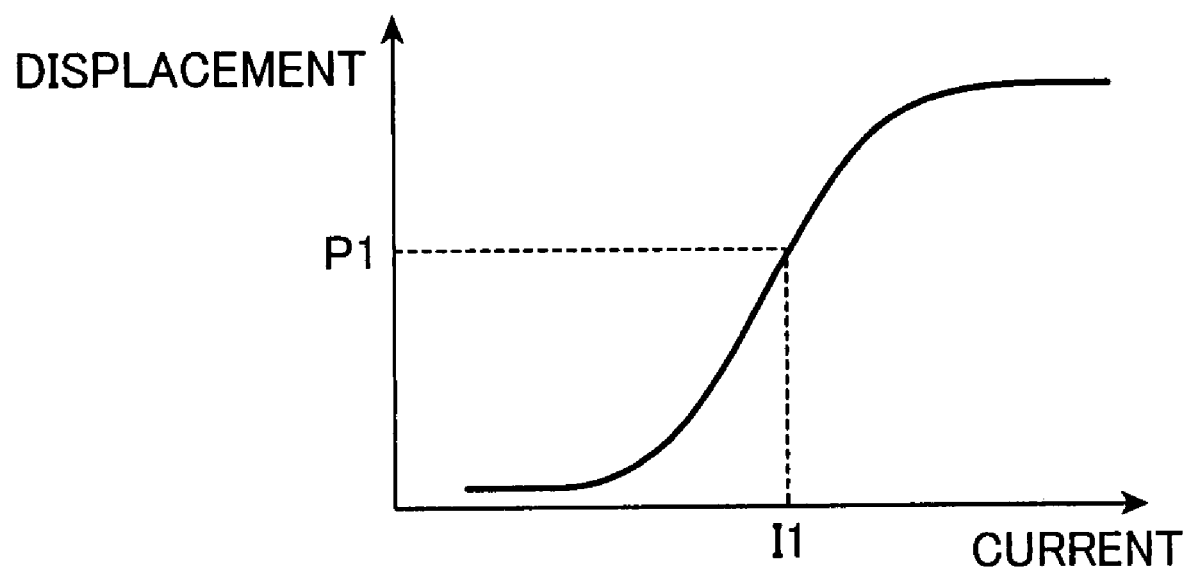
Figure 10B:
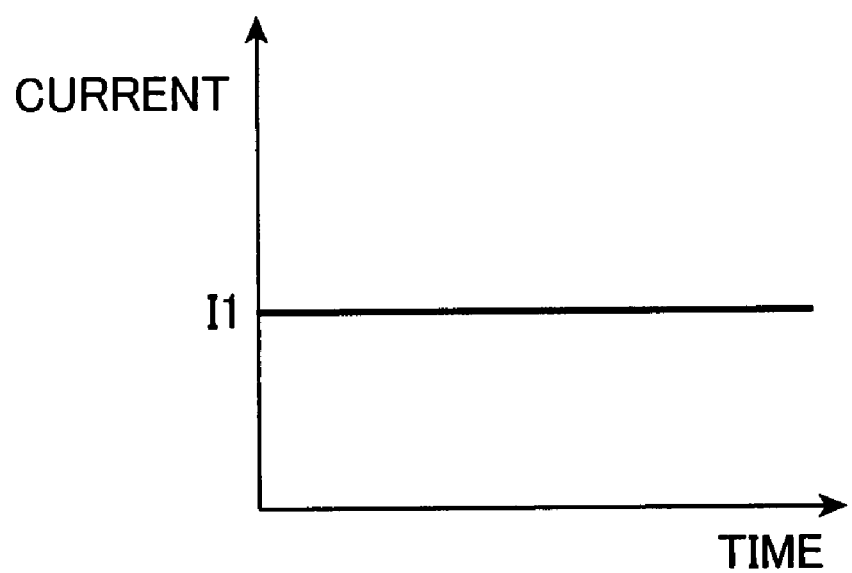

Now, an approach for drivingly controlling the SMA actuator 2 by the driving controller 10 is described. Generally, a wire-shaped SMA actuator having a circular shape in cross section has a relation concerning a constant current and a displacement, as shown in FIG. 10A. In this relation, a current with a magnitude I1 is required to obtain a displacement amount P1 for the SMA actuator. In this example, the constant current I1 is applied to the SMA actuator, as shown in FIG. 10B.

Figure 2:
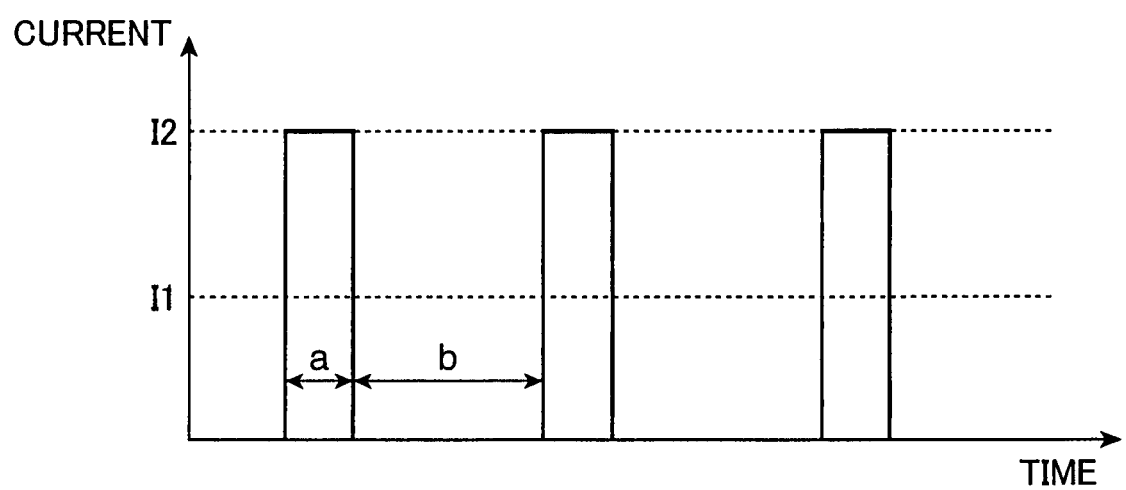
FIG. 2 is a diagram showing a pulse current to be applied to an SMA actuator in the embodiment.
Figure 3:
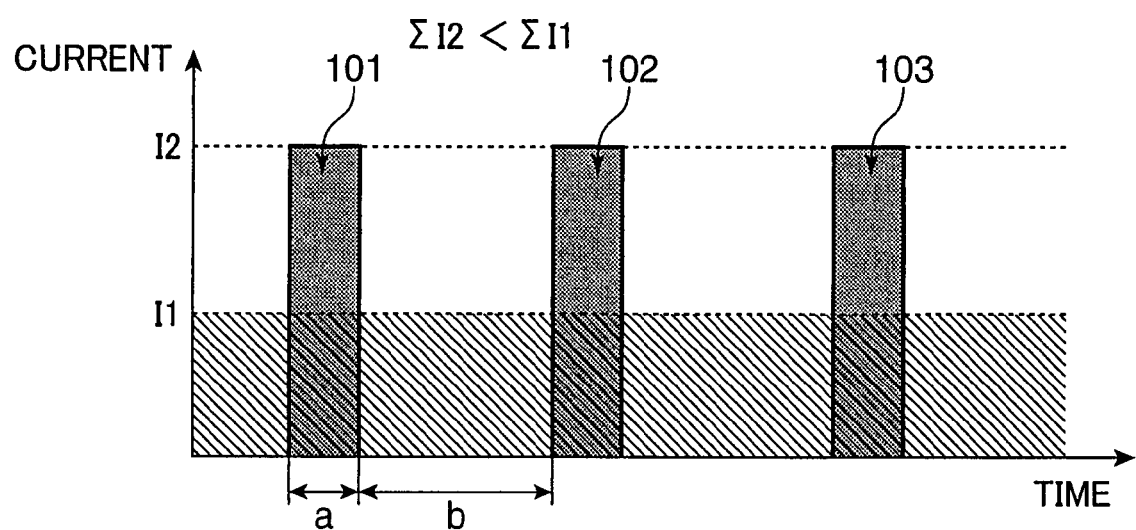
FIG. 3 is a diagram for describing that the amount of applied current by the pulse current shown in FIG. 2 is smaller than the amount of applied current by a constant current I1.

FIG. 2 is a diagram showing a manner as to how a current is applied to the SMA actuator 2 in the embodiment. As shown in FIG. 2, a pulse current is applied to the SMA actuator 2. The pulse current has a current value with a magnitude i.e. a peak I2, and a ratio of an ON time to an OFF time of the pulse current i.e. a duty ratio. In FIG. 2, the symbol "a" represents an ON time, and the symbol "b" represents an OFF time. The current value I2 and the duty ratio of the pulse current are, as shown in FIG. 3, set to a predetermined value e.g. about 5 to 50% in terms of the duty ratio, which satisfies the relation: $\Sigma I2 < I1$ where $\Sigma I2$ is the total current amount to be applied to the SMA actuator 2, and $\Sigma I1$ is the total current amount assuming that the constant current I1 is applied to the SMA actuator 2. The current value I2 is larger than the current value I1. Also, $\Sigma I2$ is the sum of integrating pulses 101, 102, 103, . . . during a time when the pulse current is applied to the SMA actuator 2. Each of the pulses has a current value with a magnitude I2, and has a time duration "a", which corresponds to a time duration when the SMA actuator 2 is energized with the current value I2, and corresponds the aforementioned ON-time "a". Likewise, $\Sigma I1$ is the sum of integrating the constant current I1 during a time when the pulse current is applied to the SMA actuator 2.

The current value I2 is set to about 1.5 to 5 times as large as the current value I1. Also, it is desirable to set the current value I2 to a current value approximate to a current value (hereinafter, called as "maximally displaceable current value") capable of obtaining a substantially maximal displacement speed for the SMA actuator 2. The current value for obtaining the maximal displacement speed for the SMA actuator 2 is e.g. a current value of making a gradient of a rising portion of a displacement characteristic largest. In the displacement characteristic, the axis of abscissas represents a time, and the axis of ordinate represents a displacement amount of the SMA actuator 2. The displacement characteristic is defined with respect to each of the current values.

The duty ratio is determined based on the ON-time when the pulse current is actually applied, and the OFF-time when the application of the pulse current is suspended. Accordingly, a cycle is determined based on the duty ratio. In this embodiment, a time (a+b) corresponds to one cycle.

The electric power supplier 9 applies, to the SMA actuator 2, the pulse current having the current I2 larger than the constant current I1, and the duty ratio i.e. the cycle satisfying the relation: $\Sigma I2 < \Sigma I1$. The driving controller 10 controls the electric power supplier 9 so that the aforementioned pulse current is outputted from the electric power supplier 9.

Figure 4:
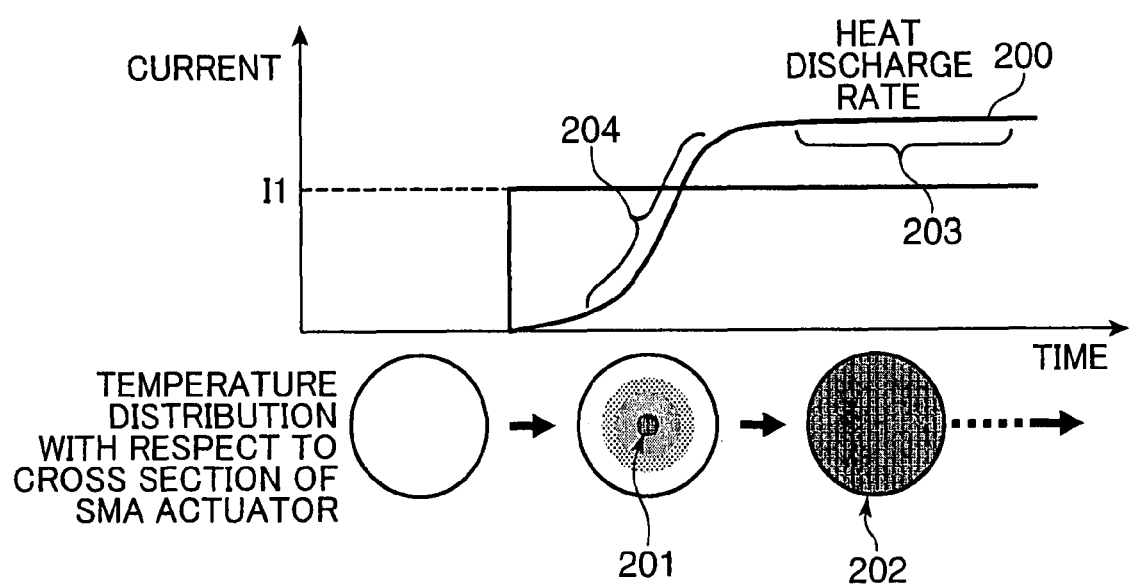
FIG. 4 is a diagram showing a relation between a temperature distribution, and a heat discharge i.e. a heat discharge rate with respect to a cross section of the SMA actuator in the case where the constant current is continued to be applied to the SMA actuator.

Next, a principle as to how the aforementioned predetermined current value and the predetermined duty ratio (and the predetermined cycle) are defined based on a transition of the internal temperature of the SMA actuator 2 is described. In the case where a metallic member such as an SMA actuator is energized and heated by application of a current, heat is discharged from a surface portion of the metallic member because the surface portion contacts the ambient air. As a result, an internal portion of the metallic member reaches a high temperature, as compared with the surface portion thereof. FIG. 4 is a diagram showing a relation between a temperature distribution with respect to a cross section of the SMA actuator, and a heat discharge i.e. a heat discharge rate, in the case where the constant current I1 as shown in FIG. 10B is continued to be applied. The cross section extends in a direction perpendicular to a displacement direction of the SMA actuator i.e. a longitudinal or an axial direction of the SMA actuator. A manner as to how the heat discharge rate is changed is depicted by a characteristic graph indicated by the reference numeral 200 (hereinafter, called as "heat discharge characteristic 200").

As shown in FIG. 4, when the SMA actuator is heated from an internal portion thereof indicated by the reference numeral 201, it is conceived that a difference in temperature between the internal portion and the surface portion of the SMA actuator is gradually decreased by heat conduction within the SMA actuator, and finally, the SMA actuator is brought to a thermal equilibrium condition as shown by the reference numeral 202, where the heat discharge on the surface portion, and heating resulting from application of the current are balanced. A heat discharge rate in the thermal equilibrium condition, i.e., at a portion indicated by the reference numeral 203 of the heat discharge characteristic 200 is maximum. The thermal equilibrium condition is maintained by continuing application of a constant current e.g. the constant current I1. The portion indicated by the reference numeral 204 of the heat discharge characteristic 200 is a transient region before the heat discharge rate reaches a maximal value i.e. a constant value.

Figure 5:
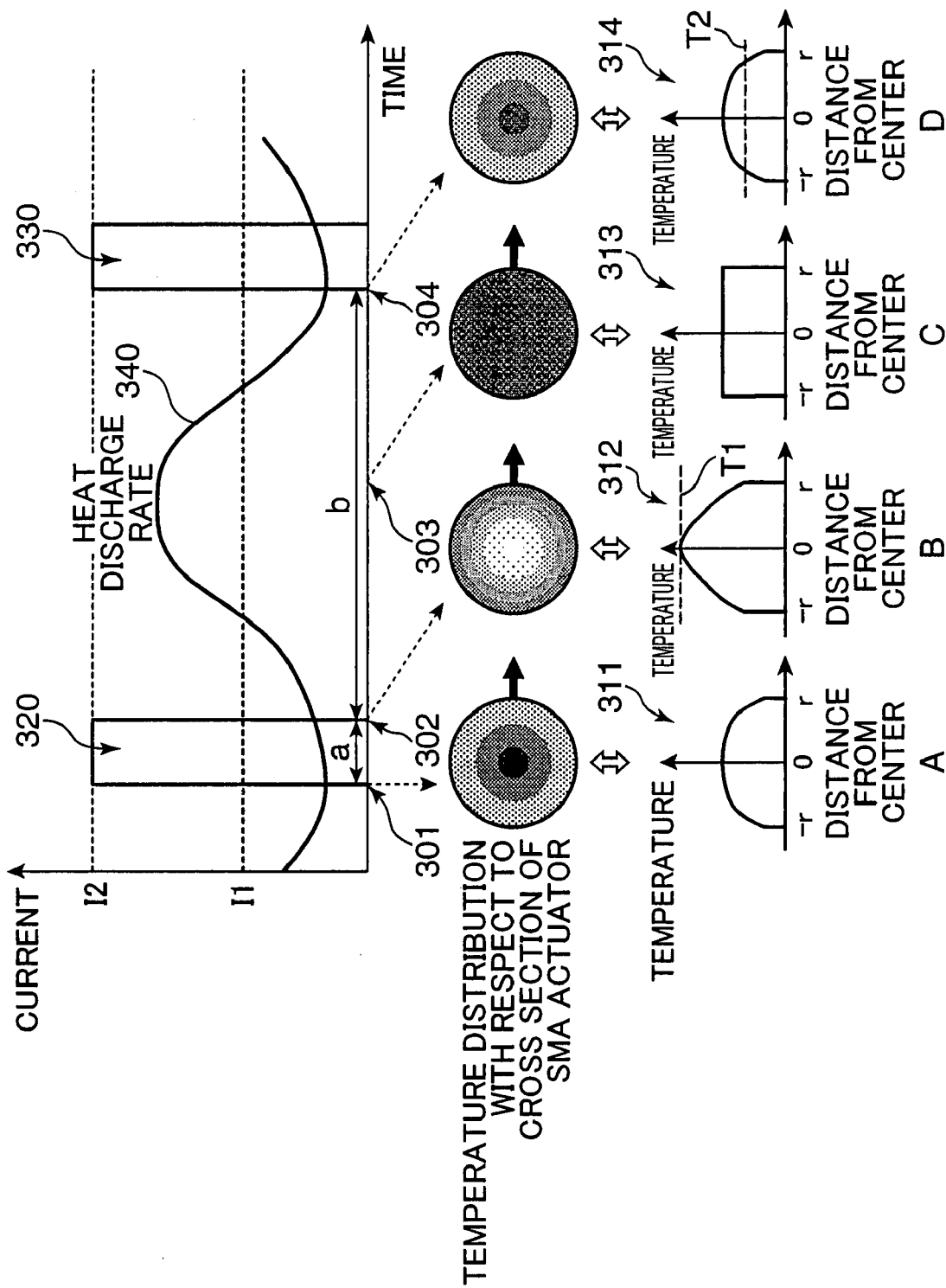
FIG. 5 is a diagram for describing a manner as to how the temperature distribution with respect to the cross section of the SMA actuator, and the heat discharge rate are varied when the pulse current is continued to be applied to the SMA actuator in the embodiment.

FIG. 5 is a diagram showing a manner as to how a temperature distribution with respect to a cross section of the SMA actuator 2, and a heat discharge rate are changed when a pulse current is continued to be applied to the SMA actuator 2 in the embodiment. Reference numerals 311, 312, 313, and 314 are temperature distributions with respect to the cross section of the SMA actuator 2 in conditions A, B, C, and D at the points of time 301, 302, 303, and 304, respectively. The distance "r" in the respective temperature distribution profiles represents a radius of the SMA actuator 2.

First, at the point of time 301, the SMA actuator 2 is started to be energized, in other words, the SMA actuator 2 is turned to an ON-state, with application of a pulse 320, which is a pulse current corresponding to one pulse having a current value I2 and a time duration "a". In response to the energization start, heating of the SMA actuator 2 is started. In this embodiment, the current value I2 is set to e.g. about 3 times as large as the constant current I1. By application of the current I2, the SMA actuator 2 is rapidly heated. In this case, similarly to the description referring to FIG. 4, the internal portion of the SMA actuator 2 reaches a high temperature, as compared with the surface portion thereof, because the surface portion contacts the ambient air. Accordingly, transformation of the internal portion of the SMA actuator 2 having a higher temperature is started earlier than the surface portion thereof. Since the portion of the SMA actuator 2 where the transformation has started has a lower electric resistance, the current gradually and intensively flows into the internal portion of the SMA actuator 2. Thus, the internal portion of the SMA actuator 2 is rapidly thermally shielded, and the temperature of the internal portion is rapidly increased by the intensive current flow and by thermal interaction between the internal portion and the surface portion having a lower temperature than that of the internal portion.

Thereafter, at the point of time 302, the energization of the SMA actuator 2 with application of the pulse 320 is suspended, in other words, the SMA actuator is turned to an OFF-state. The point of time 302 corresponds to a timing before the temperature of the surface portion of the SMA actuator 2 reaches an equilibrium temperature T1 substantially equal to the temperature of the inner portion of the SMA actuator 2, which is higher than that of the surface portion, by thermal conduction. In other words, the timing corresponding to the point of time 302 when the energization is suspended is a timing after the average temperature of the SMA actuator 2 reaches a temperature substantially equal to or higher than an equilibrium temperature obtained by continuously applying the constant current I1 to obtain a constant SMA displacement during an energization control i.e. the constant current I1 required for displacing the SMA actuator 2 by a targeted displacement amount, and before a point of time when the temperature distribution with respect to the cross section of the SMA actuator 2 in a direction perpendicular to the displacement direction of the SMA actuator 2 is balanced with the internal temperature of the SMA actuator 2. As a result of the equilibrium operation, the temperature distribution 311 in the condition A at the point of time 301 is changed to the temperature distribution 312 in the condition B at the point of time 302. Concerning the temperature distribution 311, the temperature transition of the inner portion shows a moderately rising curve, as compared with the temperature transition of the surface portion i.e. the r position or the −r position with respect to the center O. Concerning the temperature distribution 312 after the energization, the temperature transition of the inner portion i.e. a portion near the center O shows a sharp peak, with its temperature being raised to a higher temperature.

After the energization is suspended at the point of time 302, the entirety of the SMA actuator 2 is gradually brought to an equilibrium condition by thermal conduction. As a result, the entirety of the SMA actuator 2 has a substantially uniform temperature i.e. an equilibrium temperature, as shown by the temperature distribution 313 in the condition C at the point of time 303, for instance. The temperature distribution in the condition C may not be necessarily identical to the temperature distribution in the thermal equilibrium condition shown by the reference numeral 202 in FIG. 4. The heat discharge rate is determined based on a difference between the ambient temperature and the surface temperature of the SMA actuator. Accordingly, as shown by a heat discharge characteristic 340 shown in FIG. 5, after the energization is started at the point of time 301, the surface temperature of the SMA actuator 2 is started to be increased. Then, after the point of time 302, as the surface temperature is increased in order to attain equilibrium with the internal temperature, the heat discharge rate is increased. The heat discharge rate is maximum at the point of time e.g. the point of time 303 when the surface temperature reaches a highest value.

Thereafter, since the heat discharge is accelerated on the surface portion of the SMA actuator 2, the temperature of the SMA actuator 2 is lowered from the surface portion. At the point of time 304 when the temperature of the SMA actuator 2 falls to a certain temperature or below, for instance, energization of the SMA actuator 2 by application of a next pulse current i.e. a pulse 330 is started. As the condition of the SMA actuator 2 is changed from the condition C to the condition D corresponding to the point of time 304, the temperature distribution of the SMA actuator 2 is changed from the temperature distribution 313 to the temperature distribution 314. The temperature distribution 314 is a temperature distribution substantially equivalent to the temperature distribution in the condition A, although actually there is a slight difference between the temperature distribution 314 and the temperature distribution 311. The timing e.g. the point of time 304 when the energization is resumed is a predetermined timing after the average temperature of the SMA actuator 2 has reached a temperature obtained by continuously applying the constant current I1, i.e., a temperature lower than the equilibrium temperature. The average temperature is e.g. a temperature T2 shown in the condition D, and is a temperature obtained by averaging a temperature distribution with respect to the cross section of the SMA actuator 2. In other words, in the embodiment, a pulse is applied with a timing when a cooling rate is substantially made constant, i.e., a timing (a duty ratio or a cycle) of making the level of the heat discharge rate in the heat discharge characteristic 340 substantially equal to the level at the point of time 301, or of making the temperature distribution in the condition D substantially equal to the temperature distribution in the condition A. In this embodiment, the duty ratio is set to e.g. about 15 to 20%, or the cycle is set to about 5 kHz. The driving controller 10 controls driving of the electric power supplier 9 so that a pulse current having the aforementioned timing is outputted.

Continuously applying the pulse current having the aforementioned cycle to the SMA actuator 2 enables to substantially retain the transformation of the SMA actuator 2, while utilizing the internal latent heat, without retaining the transformation of the SMA actuator 2 while keeping the heat discharge rate of the SMA actuator 2 i.e. the surface temperature of the SMA actuator 2 to a constant level in a thermal or temperature equilibrium condition. As compared with the heat discharge rate of the SMA actuator in the case where the thermal equilibrium condition is attained with the constant current I1 i.e. the heat discharge rate at the portion indicated by the reference numeral 203 in FIG. 4, the heat discharge rate of the SMA actuator 2 by application of the pulse current according to the embodiment of the invention, i.e. in the conditions A through D, provides a smaller difference between the ambient temperature and the surface temperature of the SMA actuator 2. This shows that the heat discharge rate of the SMA actuator 2 in the embodiment is reduced, as compared with the conventional arrangement.

As mentioned above, applying the pulse current according to the embodiment of the invention to the SMA actuator 2 is advantageous in reducing the heat discharge rate on the surface portion of the SMA actuator 2, while retaining a predetermined SMA transformation temperature, and in obtaining a constant SMA displacement during an energization control with a less integrated current amount, as compared with the arrangement that the constant current I1 is applied to obtain the constant SMA displacement. This shows that applying the pulse current to the SMA actuator 2 is advantageous in reducing the entire amount of electric power usage.

Figure 6:
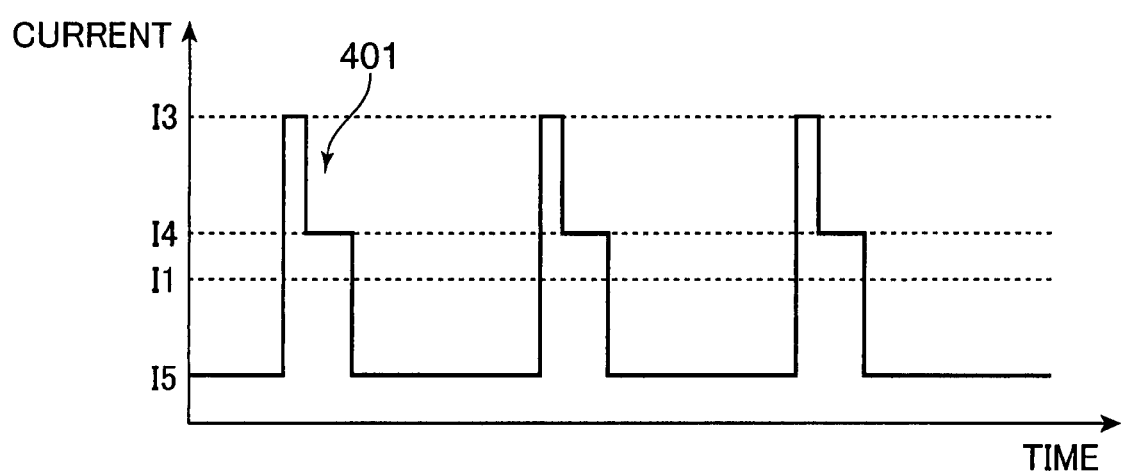
FIG. 6 is a diagram showing a modification of the pulse current shown in FIG. 2.
Figure 7:
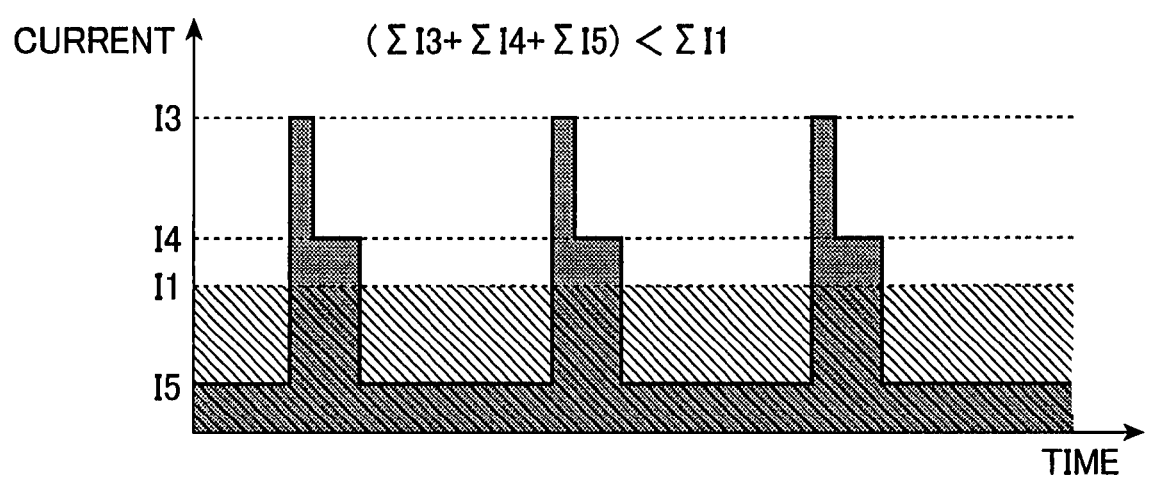
FIG. 7 is a diagram for describing that the amount of applied current by the modified pulse current shown in FIG. 6 is smaller than the amount of applied current by the constant current I1.

The pulse current shown in FIG. 2 may have a pulse configuration e.g. as shown in FIG. 6, in place of the generally available rectangular shape. Specifically, the pulse current may have a so-called step pulse with a step portion in the current value level, which has different current values e.g. three current values I3, I4, and I5 (in this modification, different voltage values corresponding to the different current values may be applied), and a predetermined duty ratio (and a predetermined cycle). Similarly to the arrangement of applying the pulse current shown in FIG. 2, the step pulse is applied in such a manner that: at least one of the current values (in this embodiment, the current value I3) among the different current values is set to a current value larger than the constant current I1 required for obtaining a constant SMA displacement during the energization control; and that the current values and the duty ratio of the pulse current are set to predetermined values that satisfy the relation: $(\Sigma I3+\Sigma I4+\Sigma I5)<\Sigma I1$, as shown in FIG. 7, where $\Sigma I3+\Sigma I4+\Sigma I5$ is the total current amount to be applied to the SMA actuator 2, and $\Sigma I1$ is the total current amount assuming that the constant current I1 is applied to the SMA actuator 2.

The shape of the step pulse is not limited to the above. Alternatively, a step pulse merely composed of the current values I5 and I3, without a step portion corresponding to the current value I4 in the pulse current shown in FIG. 6, may be applied. Further alternatively, a step pulse without the current value I5, in other words, a step pulse having the de-energization time duration "b" as shown by the pulse current in FIG. 2, and having different current values such as the current values I3 and I4, may be applied. In other words, as long a pulse has plural different current values, the pulse may be used as the step pulse.

Figure 8:
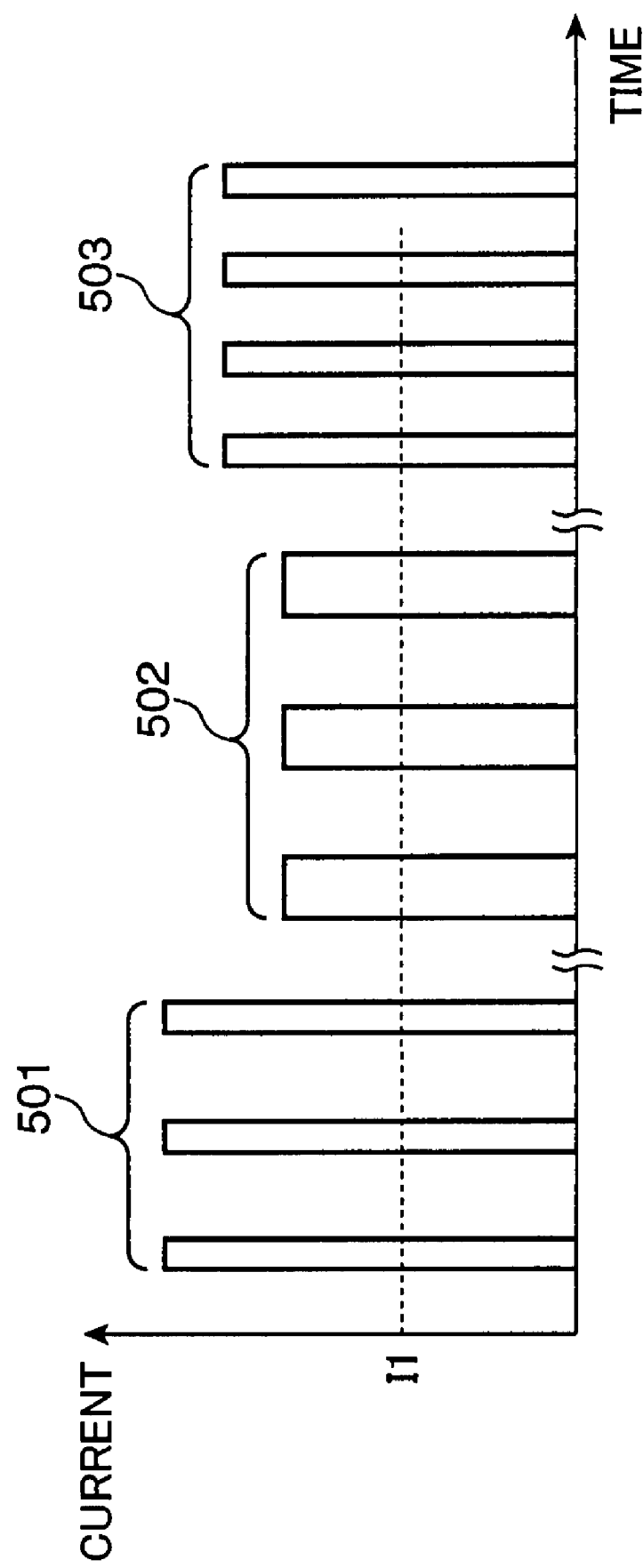
FIG. 8 is a diagram showing another modification of the pulse current shown in FIG. 2.

In the embodiment, as shown in FIGS. 2 and 3, the SMA actuator 2 is driven by using the substantially uniform pulse current having the current value (or the voltage value) larger than the constant current I1 required for displacing the SMA actuator 2 by the predetermined targeted displacement amount, and having the duty ratio (and the cycle) of making the applied current amount smaller than the applied current amount required in applying the constant current I1 to the SMA actuator 2 i.e. $Y\Sigma I2<\Sigma I1$, in other words, by using the pulse current composed of the pulses 101, 102, 103, which are identical to each other in the magnitude and the configuration. Alternatively, as shown in FIG. 8, for instance, the SMA actuator 2 may be driven by preparing different patterns concerning the current value and the duty ratio (and the cycle) e.g. pulse patterns indicated by the reference numerals 501, 502, and 503, and by selectively using the patterns according to the conditions. It is not necessary that values in both of the parameters i.e. the current value and the duty ratio (and the cycle) are different with respect to each of the patterns. The patterns may be selectively used in such a manner that values in at least one parameter are different from each other. For instance, the same value may be used for the duty ratio, and different values may be used for the current value.

Selectively using the patterns according to the conditions means that an intended pattern is selected according to a condition in driving the SMA actuator 2 including e.g. a case that the actuator is intended to be driven at a faster speed (high-speed driving mode) even if an applied current amount i.e. an electric power consumption rate is increased, and a case that an applied current amount is suppressed in battery driving or a like operation; and that the pulse current having the selected pattern is applied to the SMA actuator 2. In the modification, the actuator driving device 1 may include a pattern information storage for storing information relating to the different patterns in e.g. the driving controller 10, and the driving controller 10 may be operative to select and set a certain pattern from the pattern information storage in response to a user's selection and designation by way of the unillustrated operation section for actuator driving.

The following modifications are applicable to the invention.

Figure 9:
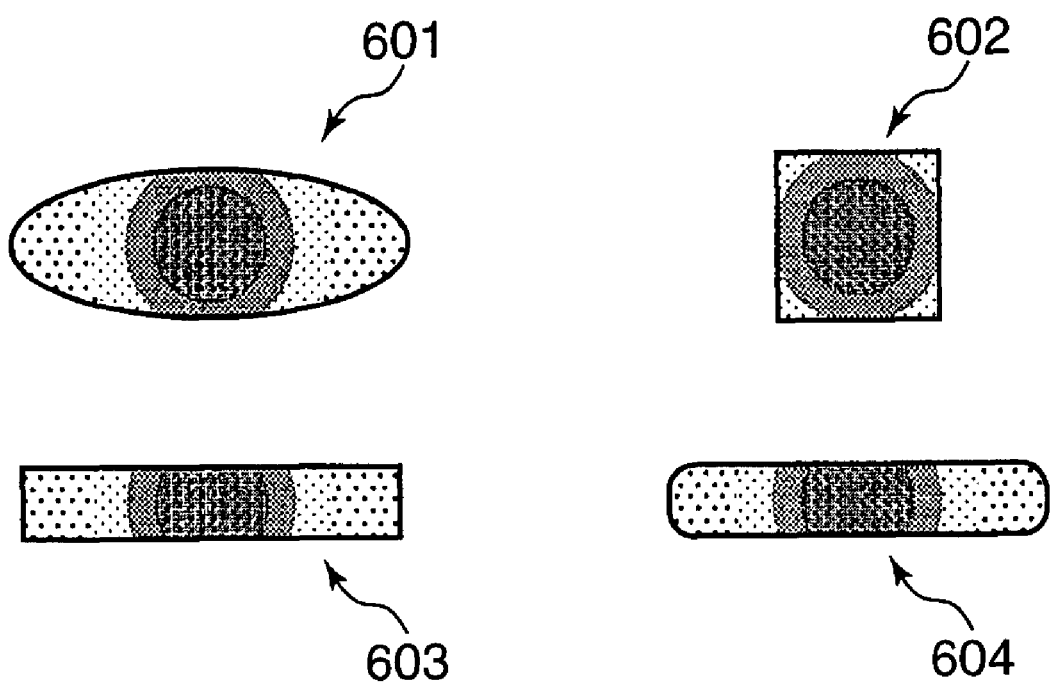
FIG. 9 is a diagram showing modifications of the SMA actuator.

In the embodiment, the SMA actuator 2 is a wire member having a substantially perfect circular shape in cross section. Alternatively, as shown in FIG. 9, the SMA actuator 2 may be a wire member, a prismatic member, or a plate member including a film-like member and a thin plate-like member, with a shape in cross section such as a circular shape other than the perfect circular shape as indicated by the reference numeral 601, including an elliptical shape, a substantially square shape as indicated by the reference numeral 602, and substantially rectangular shapes including strip-like rectangular shapes as indicated by the reference numerals 603 and 604. Further alternatively, shapes other than the aforementioned shapes may be used, as long as the aforementioned operations and effects are substantially obtained. With use of the SMA actuators having the modified shapes, substantially the same effects as mentioned above can be obtained by adjusting the pulse current so that the surface temperature of the respective SMA actuators is not made uniform. In view of a property of the SMA actuator that heating i.e. transformation is difficult, as the distance from the central portion of the SMA actuator where the energization amount is large is increased, energization control is made easy in the case where the SMA actuator has a perfect circular shape in cross section because the distance from the central portion is identical in the SMA actuator having the perfect circular shape in cross section.

The current value and the duty ratio of the pulse current to be used in the embodiment satisfy the aforementioned requirements. Briefly saying, the current value is larger than I1, and the integrated value is smaller than ΣI1. The kind of the material of the SMA actuator 2, or the shape or the size of the cross section of the SMA actuator 2 determines the requirements concerning the current value and the duty ratio of the pulse current. In view of this, the current value and the duty ratio may be determined based on a correlation with the surface area or the volume of the SMA actuator 2.

The following is a summary of the embodiment and/or the modifications of the invention.

In the actuator driving device 1, the SMA actuator 2 as an actuator is made of a shape metal alloy having a property that a predetermined shape is memorized in advance, and that the memorized shape is recovered when the actuator is heated to a predetermined temperature. The electric power supplier 9 as an applier applies, to the SMA actuator 2, a pulse current (or a pulse voltage) at least having a predetermined current value (or a predetermined voltage value), and a predetermined duty ratio. The driving controller 10 as a determiner is operative to determine the current value (or the voltage value), and the duty ratio of the pulse current (or the pulse voltage) to be applied to the SMA actuator 2 by the electric power supplier 9. The driving controller 10 is operative to determine the pulse current (or the pulse voltage) having the current value I2 larger than the current value I1 of the constant current I1 required for displacing the SMA actuator 2 by a predetermined targeted displacement amount e.g. the displacement amount P1 shown in FIG. 10 (or a voltage value corresponding to the current value I2), and the duty ratio of making the applied current amount ΣI2 smaller than the applied current amount ΣI1 corresponding to an integrated value of the constant current I1 in applying the constant current I1 to the SMA actuator 2. This enables to suppress an electric power consumption rate while securing an intended displacement by the SMA actuator 2 made of the shape metal alloy in driving the SMA actuator 2, in other words, securing the performance of the actuator driving device 1.

Also, in the actuator driving device 1, the SMA actuator 2 is made of a shape metal alloy having a property that a predetermined shape is memorized in advance, and that the memorized shape is recovered when the actuator is heated to a predetermined temperature. The electric power supplier 9 is operative to apply, to the SMA actuator 2, a pulse current (or a pulse voltage) at least having a predetermined current value (or a predetermined voltage value), and a predetermined duty ratio. The driving controller 10 is operative to determine the current value (or the voltage value), and the duty ratio of the pulse current (or the pulse voltage) to be applied to the SMA actuator 2 by the electric power supplier 9. The driving controller 10 is operative to determine the pulse current (or the pulse voltage) having the current value I2 larger than the current value of the constant current I1 required for displacing the SMA actuator 2 by a predetermined targeted displacement amount (or the voltage value corresponding to the current value I2), and having such a cycle that the SMA actuator 2 is de-energized after the average temperature of the SMA actuator 2 reaches a temperature substantially equal to or higher than a temperature obtained by continuously applying the constant current I1 required for displacing the SMA actuator 2 by the targeted displacement amount, and before the temperature distribution with respect to the cross section of the SMA actuator 2 in the direction perpendicular to the displacement direction of the SMA actuator 2 attains an equilibrium, in other words, at the timing corresponding to the point of time 302 shown in FIG. 5, and then, the SMA actuator 2 is energized after the average temperature of the SMA actuator 2 reaches a temperature lower than a temperature obtained by continuously applying the constant current I1 required for displacing the SMA actuator 2 by the targeted displacement amount, in other words, at the timing corresponding to the point of time 304 in FIG. 5. With use of the simplified controlling method of energizing and de-energizing as mentioned above, the actuator driving device 1 capable of suppressing an electric power consumption rate, while securing an intended displacement by the SMA actuator 2 can be realized.

Further, in the actuator driving device 1, the SMA actuator 2 is made of a shape metal alloy having a property that a predetermined shape is memorized in advance, and that the memorized shape is recovered when the actuator is heated to a predetermined temperature. The electric power supplier 9 is operative to apply, to the SMA actuator 2, a pulse current (or a pulse voltage) at least having a predetermined current value (or a predetermined voltage value), and a predetermined duty ratio. The driving controller 10 is operative to determine the current value (or the voltage value), and the duty ratio of the pulse current (or the pulse voltage) to be applied to the SMA actuator 2 by the electric power supplier 9. The driving controller 10 is operative to select an intended condition i.e. an intended pulse pattern from conditions i.e. pulse patterns having different pulse currents, wherein different current values (or different voltage values) are set concerning the current value I2 larger than the current value of the constant current I1 required for displacing the SMA actuator 2 by the predetermined targeted displacement amount (or the voltage value corresponding to the current value I2), and different duty ratios are set concerning the duty ratio of making the applied current amount ΣI2 smaller than the applied current amount ΣI1 corresponding to an integrated value of the constant current I1 in applying the constant current I1 to the SMA actuator 2; and is operative to determine the pulse current (or the pulse voltage) satisfying the selected condition. This enables to use the pulse current (or the pulse voltage) having the intended current value (or the intended voltage value), and the duty ratio, which is properly selected according to the usage condition i.e. the usage environment in driving the SMA actuator 2, thereby enhancing the latitude in the actuator driving.

Further, the electric power supplier 9 is so configured as to apply a pulse current (or a pulse voltage) having a predetermined cycle, in addition to the predetermined current value (or the predetermined voltage value), and the predetermined duty ratio. The driving controller 10 is operative to select an intended condition i.e. an intended pulse pattern from conditions i.e. pulse patterns having different pulse currents, wherein different current values (or different voltage values), a duty ratio, and a cycle are set concerning the current value (or the voltage value), the duty ratio, and the cycle of the pulse current (or the pulse voltage) to be applied to the SMA actuator 2 by the electric power supplier 9; and is operative to determine the pulse current (or the pulse voltage) satisfying the selected condition. This enables to use the pulse current (or the pulse voltage) having the intended current value (or the intended voltage value), the duty ratio, and the cycle, which is properly selected according to the usage condition i.e. the usage environment in driving the SMA actuator 2, thereby further enhancing the latitude in the actuator driving.

Further, in the actuator driving device 1, the SMA actuator 2 is connected to the movable member 3, and is made of a shape metal alloy having a property that a predetermined shape is memorized in advance, and that the memorized shape is recovered when the actuator is heated to a predetermined temperature. The electric power supplier 9 is operative to apply, to the SMA actuator 2, a pulse current (or a pulse voltage) at least having a predetermined current value (or a predetermined voltage value), and a predetermined duty ratio, and to change the current value (or the voltage value), and the duty ratio. The driving controller 10 is operative to determine the current value (or the voltage value), and the duty ratio to apply the pulse current (or the pulse voltage) having the current value I2 larger than the current value of the constant current I1 required for displacing the SMA actuator 2 by a predetermined targeted displacement amount (or the voltage value corresponding to the current value I2), and the duty ratio of making the applied current amount ΣI2 smaller than the applied current amount ΣI1 corresponding to an integrated value of the constant current I1 in applying the constant current I1 to the SMA actuator 2. The position sensor 7 and the position calculator 8 as a detector detect a displacement amount of the movable member 3 in accordance with a displacement of the SMA actuator 2. The driving controller 10 is operative to change at least one of the current value (or the voltage value), and the duty ratio in determining the current value (or the voltage value), and the duty ratio, and to vary the degree of change concerning the current value (or the voltage value), and the duty ratio in accordance with a difference between the displacement amount of the movable member 3 detected by the detector, and the targeted displacement amount. This enables to execute precise actuator driving based on servo control i.e. controllably move the movable member to the targeted position.

Further, the electric power supplier 9 applies a current (or a voltage) having a current value (or a voltage value) approximate to a maximally displaceable current value (or a maximally displaceable voltage value) capable of obtaining a substantially maximal displacement speed for the SMA actuator 2. This enables to efficiently and expediently displace i.e. drive the SMA actuator 2.

Furthermore, in the actuator driving device 1, the SMA actuator 2 is made of a shape metal alloy having a property that a predetermined shape is memorized in advance, and that the memorized shape is recovered when the actuator is heated to a predetermined temperature. The electric power supplier 9 is operative to apply, to the SMA actuator 2, a step current (see FIG. 6, or a step voltage) at least having different current values (or different voltage values), and a predetermined duty ratio. The driving controller 10 is operative to determine the different current values (or the different voltage values), and the duty ratio of the step current (or the step voltage) to be applied to the SMA actuator 2 by the electric power supplier 9. The driving controller 10 is operative to determine the step current (or the step voltage) having at least one of the current values (or the voltage values) concerning the current value I2 larger than the current value of the constant current I1 required for displacing the SMA actuator 2 by a predetermined targeted displacement amount (or the voltage value corresponding to the current value I2), and having a duty ratio of making the applied current amount ΣI2 smaller than the applied current amount ΣI1 corresponding to an integrated value of the constant current I1 in applying the constant current I1 to the SMA actuator 2. This provides a latitude in controlling a pulse waveform, as compared with the arrangement of using the rectangular pulse i.e. the general pulse configuration as shown in FIG. 2. In other words, this enables to define the pulse waveform more finely, and consequently to suppress an electric power consumption rate by a notched portion of the pulse indicated by e.g. the reference numeral 401 in FIG. 6. Thus, the arrangement is more advantageous in suppressing the electric power consumption rate of the actuator driving device 1.

Furthermore, the SMA actuator 2 is a wire member having a substantially perfect circular shape in cross section in the direction perpendicular to the displacement direction of the SMA actuator 2. This enables to efficiently and uniformly heat the SMA actuator 2, and therefore facilitate energization control of the SMA actuator 2 with the current (or the voltage) i.e. the pulse current (or the pulse voltage).

An actuator driving device according to an aspect of the invention comprises: an actuator made of a shape metal alloy having a property that a predetermined shape is memorized in advance, and that the predetermined memorized shape is recovered when the actuator is heated to a predetermined temperature; an applier for applying, to the actuator, a pulse current or a pulse voltage at least having a predetermined current value or a predetermined voltage, and a predetermined duty ratio to heat the actuator; and a determiner for determining the current value or the voltage value, and the duty ratio of the pulse current or the pulse voltage to be applied to the actuator by the applier, wherein the determiner is operative to determine the pulse current or the pulse voltage having: the current value larger than a current value of a constant current required for displacing the actuator by a predetermined targeted displacement amount, or the voltage value corresponding thereto; and the duty ratio of making an applied current amount smaller than an applied current amount corresponding to an integrated value of the constant current in applying the constant current to the actuator.

An actuator driving device according to another aspect of the invention comprises: an actuator made of a shape metal alloy having a property that a predetermined shape is memorized in advance, and that the predetermined memorized shape is recovered when the actuator is heated to a predetermined temperature; an applier for applying, to the actuator, a pulse current or a pulse voltage at least having a predetermined current value or a predetermined voltage, and a predetermined duty ratio to heat the actuator; and a determiner for determining the current value or the voltage value, and the duty ratio of the pulse current or the pulse voltage to be applied to the actuator by the applier, wherein the determiner is operative to determine the pulse current or the pulse voltage: having the current value larger than a current value of a constant current required for displacing the actuator by a predetermined targeted displacement amount, or the voltage value corresponding thereto; and having such a cycle that the actuator is de-energized after an average temperature of the actuator reaches a temperature substantially equal to or higher than a temperature obtained by continuously applying the constant current required for displacing the actuator by the targeted displacement amount, and before a temperature distribution with respect to a cross section of the actuator in a direction perpendicular to a displacement direction of the actuator attains an equilibrium, and then, the actuator is energized after the average temperature of the actuator reaches a temperature lower than a temperature obtained by continuously applying the constant current required for displacing the actuator by the targeted displacement amount.

An actuator driving device according to yet another aspect of the invention comprises: an actuator made of a shape metal alloy having a property that a predetermined shape is memorized in advance, and that the predetermined memorized shape is recovered when the actuator is heated to a predetermined temperature; an applier for applying, to the actuator, a pulse current or a pulse voltage at least having a predetermined current value or a predetermined voltage, and a predetermined duty ratio to heat the actuator; and a determiner for determining the current value or the voltage value, and the duty ratio of the pulse current or the pulse voltage to be applied to the actuator by the applier, wherein the determiner is operative to select an intended condition from conditions, wherein different current values or different voltage values are set concerning the current value larger than a current value of a constant current required for displacing the actuator by a predetermined targeted displacement amount, or the voltage value corresponding thereto, and different duty ratios are set concerning the duty ratio of making an applied current amount smaller than an applied current amount corresponding to an integrated value of the constant current in applying the constant current to the actuator; and the determiner is operative to determine the pulse current or the pulse voltage satisfying the selected condition.

Preferably, the applier may be operative to apply the pulse current or the pulse voltage having a predetermined cycle in addition to the predetermined current value or the predetermined voltage value, and the predetermined duty ratio; the determiner may be operative to select an intended condition from conditions, wherein different current values or different voltage values, a duty ratio, and a cycle are set concerning the current value or the voltage value, the duty ratio, and the cycle of the pulse current or the pulse voltage to be applied to the actuator by the applier; and the determiner may be operative to determine the pulse current or the pulse voltage satisfying the selected condition.

An actuator driving device according to a further aspect of the invention comprises: a movable member; an actuator which is connected to the movable member, and is made of a shape metal alloy having a property that a predetermined shape is memorized in advance, and that the predetermined memorized shape is recovered when the actuator is heated to a predetermined temperature; an applier for applying, to the actuator, a pulse current or a pulse voltage at least having a predetermined current value or a predetermined voltage, and a predetermined duty ratio to heat the actuator, the actuator being so configured as to change the current value or the voltage value, and the duty ratio; a determiner for determining the current value or the voltage value, and the duty ratio to apply the pulse current or the pulse voltage to the actuator, the pulse current or the pulse voltage having the current value larger than a current value of a constant current required for displacing the actuator by a predetermined targeted displacement amount, or the voltage value corresponding thereto; and the duty ratio of making an applied current amount smaller than an applied current amount corresponding to an integrated value of the constant current in applying the constant current to the actuator; and a detector for detecting a displacement amount of the movable member in accordance with a displacement of the actuator, wherein the determiner is operative to change at least one of the current value or the voltage value, and the duty ratio in determining the current value or the voltage value, and the duty ratio; and the determiner is operative to vary a degree of the change in accordance with a difference between the displacement amount of the movable member detected by the detector, and the targeted displacement amount.

Preferably, the applier may apply, to the actuator, a current or a voltage having a current value or a voltage value approximate to a maximally displaceable current value or a maximally displaceable voltage value capable of obtaining a substantially maximal displacement speed for the actuator.

An actuator driving device according to a furthermore aspect of the invention comprises: an actuator made of a shape metal alloy having a property that a predetermined shape is memorized in advance, and that the predetermined memorized shape is recovered when the actuator is heated to a predetermined temperature; an applier for applying, to the actuator, a step current or a step voltage at least having a plurality of different current values or a plurality of different voltage values, and a predetermined duty ratio to heat the actuator; and a determiner for determining the current values or the voltage values, and the duty ratio of the step current or the step voltage to be applied to the actuator by the applier, wherein the determiner is operative to determine the step current or the step voltage having: at least one of the current values larger than a current value of a constant current required for displacing the actuator by a predetermined targeted displacement amount, or a voltage value corresponding thereto; and the duty ratio of making an applied current amount smaller than an applied current amount corresponding to an integrated value of the constant current in applying the constant current to the actuator.

Preferably, the actuator may be a wire member having a substantially perfect circular shape in cross section in a direction perpendicular to a displacement direction of the actuator.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An actuator driving device, comprising:
an actuator made of a shape metal alloy having a property that a predetermined shape is memorized in advance, and that the predetermined memorized shape is recovered when the actuator is heated to a predetermined temperature;
an applier for applying, to the actuator, a pulse current or a pulse voltage at least having a predetermined current value or a predetermined voltage, and a predetermined duty ratio to heat the actuator; and
a determiner for determining the current value or the voltage value, and the duty ratio of the pulse current or the pulse voltage to be applied to the actuator by the applier, wherein
the determiner is operative to determine the pulse current or the pulse voltage having: the current value larger than a current value of a constant current required for displacing the actuator by a predetermined targeted displacement amount, or the voltage value corresponding thereto; the duty ratio of making an applied current amount smaller than an applied current amount corresponding to an integrated value of the constant current in applying the constant current to the actuator; and wherein the applier applies, to the actuator, a current or a voltage having a current value or a voltage value approximately corresponding to a value making a gradient of a rising portion of a displacement characteristic largest.

2. An actuator driving device, comprising:
an actuator made of a shape metal alloy having a property that a predetermined shape is memorized in advance, and that the predetermined memorized shape is recovered when the actuator is heated to a predetermined temperature;
an applier for applying, to the actuator, a pulse current or a pulse voltage at least having a predetermined current value or a predetermined voltage, and a predetermined duty ratio to heat the actuator; and
a determiner for determining the current value or the voltage value, and the duty ratio of the pulse current or the pulse voltage to be applied to the actuator by the applier, wherein
the determiner is operative to determine the pulse current or the pulse voltage: having the current value larger than a current value of a constant current required for displacing the actuator by a predetermined targeted displacement amount, or the voltage value corresponding thereto; and having such a cycle that the actuator is de-energized after an average temperature of the actuator reaches a temperature substantially equal to or higher than a temperature obtained by continuously applying the constant current required for displacing the actuator by the targeted displacement amount, and before a temperature distribution with respect to a cross section of the actuator in a direction perpendicular to a displacement direction of the actuator attains an equilibrium, and then, the actuator is energized after the average temperature of the actuator reaches a temperature lower than a temperature obtained by continuously applying the constant current required for displacing the actuator by the targeted displacement amount.

3. An actuator driving device, comprising:
an actuator made of a shape metal alloy having a property that a predetermined shape is memorized in advance, and that the predetermined memorized shape is recovered when the actuator is heated to a predetermined temperature;
an applier for applying, to the actuator, a pulse current or a pulse voltage at least having a predetermined current value or a predetermined voltage, and a predetermined duty ratio to heat the actuator; and
a determiner for determining the current value or the voltage value, and the duty ratio of the pulse current or the pulse voltage to be applied to the actuator by the applier, wherein
the applier is configured to apply a pulse current or a pulse voltage in a plurality of predetermined pulse patterns, each pulse pattern being characterized by a plurality of pulses having a particular current or voltage value and duty ratio, each of the pulse patterns differing from others of the plurality of pulse patterns by a pulse value and a duty ratio, and the determiner is configured to select one of said plurality of pulse patterns according to an intended driving mode of the actuator, wherein different current values or different voltage values are set concerning the current value larger than a current value of a constant current required for displacing the actuator by a predetermined targeted displacement amount, or the voltage value corresponding thereto, and different duty ratios are set concerning the duty ratio of making an applied current amount smaller than an applied current amount corresponding to an integrated value of the constant current in applying the constant current to the actuator.

4. An actuator driving device, comprising:
a movable member;
an actuator which is connected to the movable member, and is made of a shape metal alloy having a property that a predetermined shape is memorized in advance, and that the predetermined memorized shape is recovered when the actuator is heated to a predetermined temperature;
an applier for applying, to the actuator, a pulse current or a pulse voltage at least having a predetermined current value or a predetermined voltage, and a predetermined duty ratio to heat the actuator, the applier being so configured as to change the current value or the voltage value, and the duty ratio;
a determiner for determining the current value or the voltage value, and the duty ratio to apply the pulse current or the pulse voltage to the actuator, the pulse current or the pulse voltage having the current value larger than a current value of a constant current required for displacing the actuator by a predetermined targeted displacement amount, or the voltage value corresponding thereto; and the duty ratio of making an applied current amount smaller than an applied current amount corresponding to an integrated value of the constant current in applying the constant current to the actuator; and
a detector for detecting a displacement amount of the movable member in accordance with a displacement of the actuator, wherein
the determiner is operative to change at least one of the current value or the voltage value, and the duty ratio in determining the current value or the voltage value, and the duty ratio; and
the determiner is operative to vary a degree of the change in accordance with a difference between the displacement amount of the movable member detected by the detector, and the targeted displacement amount;
wherein the applier applies, to the actuator, a current or a voltage having a current value or a voltage value approximately corresponding to a value making a gradient of a rising portion of a displacement characteristic largest.

5. The actuator driving device according to claim 2, wherein the applier applies, to the actuator, a current or a voltage having a current value or a voltage value approximate to a maximally displaceable current value or a maximally displaceable voltage value capable of obtaining a substantially maximal displacement speed for the actuator.

6. The actuator driving device according to claim 3, wherein
the applier applies, to the actuator, a current or a voltage having a current value or a voltage value approximate to a maximally displaceable current value or a maximally displaceable voltage value capable of obtaining a substantially maximal displacement speed for the actuator.

7. An actuator driving device, comprising:
an actuator made of a shape metal alloy having a property that a predetermined shape is memorized in advance, and that the predetermined memorized shape is recovered when the actuator is heated to a predetermined temperature;
an applier for applying, to the actuator, a repeated succession of step currents or step voltages, each step current or step voltage having a plurality of different current values or a plurality of different voltage values, and a predetermined duty ratio to heat the actuator; and
a determiner for determining the current values or the voltage values, and the duty ratio of the step current or the step voltage to be applied to the actuator by the applier, wherein
the determiner is operative to determine the step currents or the step voltages, of said repeated succession of the plurality of step currents or step voltages, having: at least one of the current values larger than a current value of a constant current required for displacing the actuator by a predetermined targeted displacement amount, or a voltage value corresponding thereto; and the duty ratio of making an applied current amount smaller than an applied current amount corresponding to an integrated value of the constant current in applying the constant current to the actuator.

8. The actuator driving device according to claim 1, wherein
the actuator is a wire member having a substantially perfect circular shape in cross section in a direction perpendicular to a displacement direction of the actuator.

9. The actuator driving device according to claim 2, wherein
the actuator is a wire member having a substantially perfect circular shape in cross section in the direction perpendicular to the displacement direction of the actuator.

10. The actuator driving device according to claim 3, wherein
the actuator is a wire member having a substantially perfect circular shape in cross section in a direction perpendicular to a displacement direction of the actuator.

11. The actuator driving device according to claim 4, wherein
the actuator is a wire member having a substantially perfect circular shape in cross section in a direction perpendicular to a displacement direction of the actuator.

12. The actuator driving device according to claim 7, wherein
the actuator is a wire member having a substantially perfect circular shape in cross section in a direction perpendicular to a displacement direction of the actuator.

13. An actuator driving device, comprising:
an actuator made of a shape metal alloy having a property that the actuator is changed into a predetermined shape when the actuator is heated to a predetermined temperature;
a pulse signal applier for applying, to the actuator, a pulse signal having a predetermined current value or a predetermined voltage value to heat the actuator; and
a controller for determining the current value or the voltage value, and a duty ratio of the pulse signal to be applied to the actuator by the pulse signal applier, wherein
in changing the actuator into the predetermined shape,
the controller is operative to set the current value or the voltage value of the pulse signal larger than a current value or a voltage value set in changing the actuator into the predetermined shape by applying a constant current or a constant voltage to the actuator, and
the controller is operative to set the duty ratio of the pulse signal so that an electric power consumption is smaller than an electric power consumption required in changing the actuator into the predetermined shape by applying the constant current or the constant voltage to the actuator;
wherein the pulse signal applier applies, to the actuator, a current or a voltage having a current value or a voltage value approximately corresponding to a value making a gradient of a rising portion of a displacement characteristic largest.

14. The actuator driving device according to claim 1, wherein
the actuator is a wire member having a shape in cross section selected from the group consisting of an elliptical shape, a substantially square shape, and a substantially rectangular shape.

15. The actuator driving device according to claim 3, wherein
the actuator is a wire member having a shape in cross section selected from the group consisting of an elliptical shape, a substantially square shape, and a substantially rectangular shape.

16. The actuator driving device according to claim 3, further comprising a pattern information storage device for storing information relating to the different pulse patterns.

17. The actuator driving device according to claim 16, wherein the determiner is configured to select a certain pulse pattern from the pattern information storage device in response to a user's selection.

18. The actuator driving device according to claim 4, wherein
the actuator is a wire member having a shape in cross section selected from the group consisting of an elliptical shape, a substantially square shape, and a substantially rectangular shape.

19. The actuator driving device according to claim 7, wherein
the actuator is a wire member having a shape in cross section selected from the group consisting of an elliptical shape, a substantially square shape, and a substantially rectangular shape.

20. The actuator driving device according to claim 13, wherein the actuator is a wire member having a shape in cross section selected from the group consisting of an elliptical shape, a substantially square shape, and a substantially rectangular shape.

21. The actuator driving device according to claim 7, wherein the determiner is operative to determine the step currents or the step voltages, of said repeated succession of the plurality of step currents or step voltages, such that for each set of step currents or step voltages, a first current or a first voltage of said set of step currents or step voltages is greater than other step currents or step voltages in the set.

* * * * *